US012634215B2

(12) United States Patent
Zhang et al.

(10) Patent No.: US 12,634,215 B2
(45) Date of Patent: May 19, 2026

(54) METHOD FOR CLOUD-EDGE DATA TRANSMISSION OF ELECTROCHEMICAL ENERGY STORAGE STATION

(71) Applicant: CSG PGC ENERGY STORAGE RESEARCH INSTITUTE, Guangzhou (CN)

(72) Inventors: Hao Zhang, Guangzhou (CN); Man Chen, Guangzhou (CN); Yumin Peng, Guangzhou (CN); Yikai Li, Guangzhou (CN); Zengtao Zhao, Guangzhou (CN); Fanqi Huang, Guangzhou (CN); Peng Peng, Guangzhou (CN); Zhenkai Hu, Guangzhou (CN); Wanzhou Sun, Guangzhou (CN); Jun She, Guangzhou (CN); Xiaoyi Wang, Guangzhou (CN)

(73) Assignee: CSG PGC ENERGY STORAGE RESEARCH INSTITUTE, Guangzhou (CN)

( * ) Notice: Subject to any disclaimer, the term of this patent is extended or adjusted under 35 U.S.C. 154(b) by 425 days.

(21) Appl. No.: 18/377,620

(22) Filed: Oct. 6, 2023

(65) Prior Publication Data

US 2024/0388517 A1 Nov. 21, 2024

(30) Foreign Application Priority Data

May 17, 2023 (CN) .......................... 202310555208.9

(51) Int. Cl.
*G06F 15/173* (2006.01)
*H04L 41/0654* (2022.01)
(Continued)

(52) U.S. Cl.
CPC ...... *H04L 43/0817* (2013.01); *H04L 41/0654* (2013.01); *H04L 67/289* (2013.01)

(58) Field of Classification Search
CPC ............. H04L 43/0817; H04L 41/0654; H04L 67/289; H04L 67/10; H04L 67/12; H04L 67/145; H02J 3/28
(Continued)

(56) References Cited

U.S. PATENT DOCUMENTS

2021/0331696 A1* 10/2021 Zhu .......................... H04L 47/24
2023/0095514 A1* 3/2023 Rafee .................... G06F 16/178
                                                           707/620
2024/0230787 A1* 7/2024 Srinivasan ......... G01R 31/3842

FOREIGN PATENT DOCUMENTS

CN        110399225 A      11/2019
CN        114253956 A      3/2022
(Continued)

OTHER PUBLICATIONS

Chinese Office Action for corresponding Application No. 202310555208.9 dated Jul. 10, 2023, 4 pages.
(Continued)

*Primary Examiner* — Nicholas P Celani
*Assistant Examiner* — Karina J Garcia-Ching
(74) *Attorney, Agent, or Firm* — K&L Gates LLP

(57) ABSTRACT

The present disclosure relates to method for cloud-edge data transmission of an electrochemical energy storage station, including: caching the first data to be transmitted and sending a connection re-establishment request to the cloud node; sending second data to be transmitted to the cloud node; sending the cached first data to the cloud node in an idle period after the first period; determining a characteristic value of third data to be transmitted, sending the characteristic value to the cloud node, and caching a non-characteristic value apart from the characteristic value, in a case where an abnormal working condition of the edge node is detected; sending to the cloud node fourth data to be (Continued)

transmitted; and sending the non-characteristic value of the third data to the cloud node in an idle period after the second period.

9 Claims, 7 Drawing Sheets

(51) Int. Cl.
*H04L 43/0817* (2022.01)
*H04L 67/289* (2022.01)
(58) Field of Classification Search
USPC ........................................................ 709/224
See application file for complete search history.

(56) References Cited

FOREIGN PATENT DOCUMENTS

| | | |
|---|---|---|
| CN | 115774580 A | 3/2023 |
| WO | 2020207371 A1 | 10/2020 |

OTHER PUBLICATIONS

Huo Yuehua and Liu Yinlong, "A Cooperative Caching Strategy Based on Content Popularity and Node Attributes in CCN," dated Jan. 15, 2018, 7 pages.
Cong, Liqun, "Edge Computing Technology in Industrial Internet Practice of Steel Industry," dated Feb. 15, 2021, 5 pages.

* cited by examiner

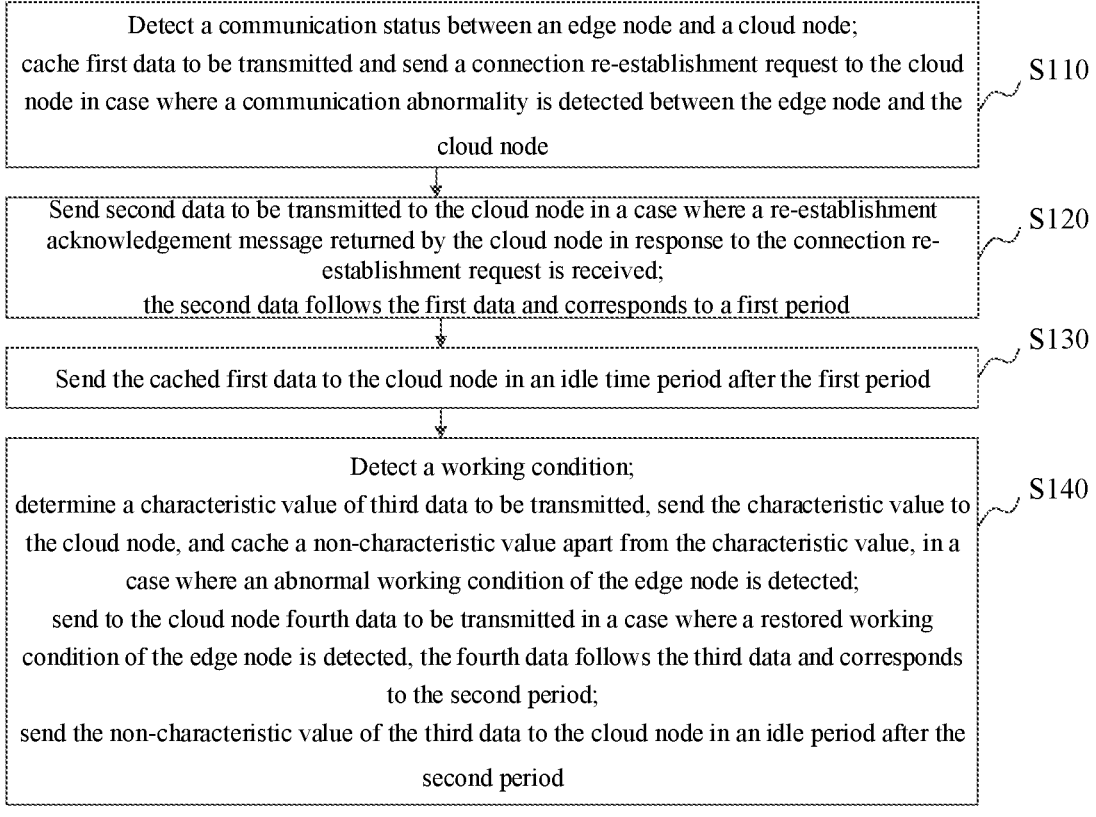

Detect a communication status between an edge node and a cloud node;
cache first data to be transmitted and send a connection re-establishment request to the cloud
node in case where a communication abnormality is detected between the edge node and the
cloud node                                                              S110

Send second data to be transmitted to the cloud node in a case where a re-establishment
acknowledgement message returned by the cloud node in response to the connection re-
establishment request is received;
the second data follows the first data and corresponds to a first period          S120

Send the cached first data to the cloud node in an idle time period after the first period   S130

Detect a working condition;
determine a characteristic value of third data to be transmitted, send the characteristic value to
the cloud node, and cache a non-characteristic value apart from the characteristic value, in a
case where an abnormal working condition of the edge node is detected;
send to the cloud node fourth data to be transmitted in a case where a restored working
condition of the edge node is detected, the fourth data follows the third data and corresponds
to the second period;
send the non-characteristic value of the third data to the cloud node in an idle period after the
second period                                                          S140

FIG. 1

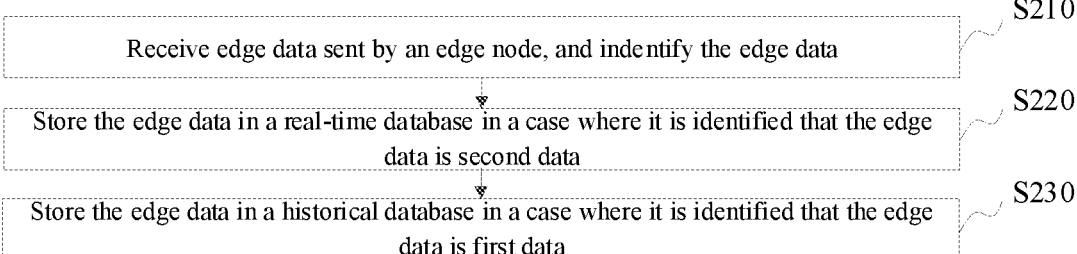

Receive edge data sent by an edge node, and identify the edge data          S210

Store the edge data in a real-time database in a case where it is identified that the edge
data is second data                                                    S220

Store the edge data in a historical database in a case where it is identified that the edge
data is first data                                                     S230

FIG. 2

METHOD FOR CLOUD-EDGE DATA TRANSMISSION OF ELECTROCHEMICAL ENERGY STORAGE STATION

CROSS REFERENCE TO RELATED APPLICATIONS

This application claims priority under 35 U.S.C. § 119 to Chinese Patent Application No. 2023105552089, filed on May 17, 2023, the entire content of which is incorporated herein in its entirety.

TECHNICAL FIELD

The present disclosure relates to a technical field of an intelligent power grid, and in particular, to a method for cloud-edge data transmission of an electrochemical energy storage station.

BACKGROUND

An electrochemical energy storage station is a power station which uses an electrochemical battery as an energy storage element and can store, convert and release electric energy. With regard to an electrochemical energy storage station, deploying an edge network near a user side can ensure data security, reduce network latency, and deploying a cloud computing network in a central position can realize centralized deployment and centralized operation and maintenance, and improve the management efficiency of the electrochemical energy storage station.

In the conventional art, by means of cloud-edge collaboration, advantages of an edge network and a cloud computing network can be combined, so that better service experience is provided, and an operation cost of the electrochemical energy storage station is reduced. However, since cloud-edge data transmission is easily affected by factors such as network fluctuations and load of a transmission channel, transmission interruption and data loss are occurred, and the reliability of the cloud-edge data transmission cannot be ensured, thereby affecting the accuracy of diagnosis and analysis of an electrochemical energy storage station.

Therefore, current technologies of the cloud-edge data transmission of the electrochemical energy storage station suffer from a problem of low reliability.

SUMMARY

In view of this, aimed to the above technical problems, it is necessary to provide a method, an apparatus, a computer device, a computer readable storage medium and a computer program product for cloud-edge data transmission of an electrochemical energy storage station capable of improving reliability of cloud-edge data transmission.

According to a first aspect, the present disclosure provides a method for cloud-edge data transmission for an electrochemical energy storage station, applied to an edge node, including:

detecting a communication status between the edge node and a cloud node;

caching first data to be transmitted and sending a connection re-establishment request to the cloud node in case where a communication abnormality is detected between the edge node and the cloud node;

sending to the cloud node second data to be transmitted in a case where a re-establishment acknowledgement message returned by the cloud node in response to the connection re-establishment request is received, the second data following the first data and corresponding to a first period;

sending the cached first data to the cloud node in an idle time period after the first period;

detecting a working condition;

determining a characteristic value of third data to be transmitted, sending the characteristic value to the cloud node, and caching a non-characteristic value apart from the characteristic value, in a case where an abnormal working condition of the edge node is detected;

sending to the cloud node fourth data to be transmitted in a case where a restored working condition of the edge node is detected, the fourth data following the third data and corresponding to the second period; and sending the non-characteristic value of the third data to the cloud node in an idle period after the second period.

In an embodiment, the first data includes at least one data packet; and the sending the cached first data to the cloud node in an idle period after the first period includes:

determining, in the idle period, a target data packet from the at least one data packet; and sending the target data packet to the cloud node.

In an embodiment, the second data carries a real-time data identifier, and the first data carries historical data identifier; the cloud node is provided with a real-time database and a historical database; and the real-time database is configured to store the second data, and the historical database is configured to store the first data.

In an embodiment, the cloud node identifies the received data, stores the data in the real-time database when it is identified that the data carries the real-time data identifier, and stores the data in the historical database when it is identified that the data carries the historical data identifier.

In an embodiment, the method further includes:

determining a point list difference between an edge node point list and a preset electrochemical energy storage station point list in response to a check request for point lists; and synchronously updating the edge node point list according to the electrochemical energy storage station point list in a case where the point list difference satisfies a first preset condition.

In an embodiment, the method further includes:

receiving a configuration parameter of the electrochemical energy storage station sent by the cloud node;

performing parameter configuration on the electrochemical energy storage station according to the configuration parameter of the electrochemical energy storage station, so as to obtain a parameter configuration result of the electrochemical energy storage station; and returning the parameter configuration result to the cloud node.

In an embodiment, the method further includes: after returning the parameter configuration result to the cloud node, acquiring the configuration parameter of the electrochemical energy storage station from the cloud node;

determining a parameter configuration difference between the edge node and the cloud node according to the configuration parameter of the electrochemical energy storage station; and returning to the step of receiving the configuration parameter of the electrochemical energy storage station sent by the cloud node in a case where the parameter configuration difference satisfies a second preset condition.

According to a second aspect, the present disclosure further provides an apparatus for cloud-edge data transmission of an electrochemical energy storage station. The apparatus includes:

a cache module configured to detect a communication status between an edge node and a cloud node, cache the first data to be transmitted and send a connection re-establishment request to the cloud node in a case where abnormal communication is detected between the edge node and the cloud node;

a real-time module configured to send to the cloud node second data to be transmitted in a case where a re-establishment acknowledgement message returned by the cloud node in response to the connection re-establishment request is received, and the second data follows the first data and corresponds to a first period;

a resuming transmission module configured to send the cached first data to the cloud node in an idle period after the first period;

a working condition abnormality module configured to detect a working condition, and determine a characteristic value of third data to be transmitted, send the characteristic value to the cloud node, and cache a non-characteristic value apart from the characteristic value in the case where an abnormal working condition of the edge node is detected;

a working condition restorage module configured to send to the cloud node fourth data to be transmitted in a case where a restored working condition of the edge node is detected, and the fourth data follows the third data and corresponds to the second period; and a characteristic sending module configured to send the non-characteristic value of the third data to the cloud node in an idle period after the second period.

According to a third aspect, the present disclosure further provides a computer device including a memory and a processor. The memory stores a computer program, and the processor, when executing the computer program, implements steps of:

detecting a communication status between an edge node and a cloud node;

caching first data to be transmitted and sending a connection re-establishment request to the cloud node in case where abnormal communication is detected between the edge node and the cloud node;

sending to the cloud node second data to be transmitted in a case where a re-establishment acknowledgement message returned by the cloud node in response to the connection re-establishment request is received, the second data following the first data and corresponding to a first period;

sending the cached first data to the cloud node in an idle period after the first period;

detecting a working condition;

determining a characteristic value of third data to be transmitted, sending the characteristic value to the cloud node, and caching a non-characteristic value apart from the characteristic value, in a case where an abnormal working condition of the edge node is detected;

sending to the cloud node fourth data to be transmitted in a case where a restored working condition of the edge node is detected, the fourth data following the third data and corresponding to the second period; and

sending the non-characteristic value of the third data to the cloud node in an idle period after the second period.

According to a fourth aspect, the present disclosure further provides a computer readable storage medium, on which a computer program is stored. When the computer program is executed by a processor, steps of:

detecting a communication status between an edge node and a cloud node;

caching first data to be transmitted and sending a connection re-establishment request to the cloud node in case where abnormal communication is detected between the edge node and the cloud node;

sending to the cloud node second data to be transmitted in a case where a re-establishment acknowledgement message returned by the cloud node in response to the connection re-establishment request is received, the second data following the first data and corresponding to a first period;

sending the cached first data to the cloud node in an idle period after the first period;

detecting a working condition;

determining a characteristic value of third data to be transmitted, sending the characteristic value to the cloud node, and caching a non-characteristic value apart from the characteristic value, in a case where an abnormal working condition of the edge node is detected;

sending to the cloud node fourth data to be transmitted in a case where a restored working condition of the edge node is detected, the fourth data following the third data and corresponding to the second period; and sending the non-characteristic value of the third data to the cloud node in an idle period after the second period.

According to a fifth aspect, the present disclosure further provides a computer program product. The computer program product includes a computer program that, when executed by a processor, implements steps of:

detecting a communication status between an edge node and a cloud node;

caching first data to be transmitted and sending a connection re-establishment request to the cloud node in case where abnormal communication is detected between the edge node and the cloud node;

sending to the cloud node second data to be transmitted in a case where a re-establishment acknowledgement message returned by the cloud node in response to the connection re-establishment request is received, the second data following the first data and corresponding to a first period;

sending the cached first data to the cloud node in an idle period after the first period;

detecting a working condition;

determining a characteristic value of third data to be transmitted, sending the characteristic value to the cloud node, and caching a non-characteristic value apart from the characteristic value, in a case where an abnormal working condition of the edge node is detected;

sending to the cloud node fourth data to be transmitted in a case where a restored working condition of the edge node is detected, the fourth data following the third data and corresponding to the second period; and sending the non-characteristic value of the third data to the cloud node in an idle period after the second period.

According to the method, apparatus, computer device, computer readable storage medium and computer program product for the cloud-edge data transmission of the electrochemical energy storage station, the communication status between the edge node and the cloud node is detected. In the case where the abnormal communication is detected between the edge node and the cloud node, first data to be transmitted is cached, and the connection re-establishment request is sent to a cloud node; and in the case where the re-establishment acknowledgement message returned by the cloud node in response to the connection re-establishment request is received, the second data to be transmitted is sent to the cloud node. The second data follows the first data and corresponds to the first period. The cached first data is sent to the cloud node in the idle period after the first period. After that, the working condition is detected. In the case where the abnormal working condition of the edge node is detected, the characteristic value of third data to be transmitted is determined, the characteristic value is sent to the cloud node, and the non-characteristic value apart from the characteristic value is cached. In the case where it is detected that the working condition of the edge node is restored, the fourth data to be transmitted is sent to the cloud node. The fourth data follows the third data and corresponds to the second period. The non-characteristic value of the third data is sent to the cloud node in the idle period after the second period. The communication condition and the working condition of the edge node of the electrochemical energy storage station can be detected successively. When the cloud-edge communication is abnormal, the first data to be transmitted is cached in the edge node, and the request to re-establish a communication connection between cloud and edge is made at the same time. When the communication connection is successfully re-established, the real-time second data is transmitted, and the first data previously cached is transmitted in the idle period after the second data is transmitted. Only the characteristic value of high importance may be transmitted when the working condition of the edge node is abnormal, and the non-characteristic value with relatively low importance is transmitted in the idle period after the working condition is restored, thereby realizing resuming transmission of the breakpoint of cloud-edge communication, and switching different transmission modes according to a load condition of a transmission channel, so as to ensure data transmission performance, and improve the reliability of the cloud-edge data transmission of the electrochemical energy storage station.

BRIEF DESCRIPTION OF THE DRAWINGS

FIG. 1 is a schematic flowchart of a method for cloud-edge data transmission of an electrochemical energy storage station according to an embodiment;

FIG. 2 is a schematic flowchart of a method for cloud-edge data transmission of an electrochemical energy storage station according to another embodiment;

DETAILED DESCRIPTION OF THE EMBODIMENTS

Figure 3:
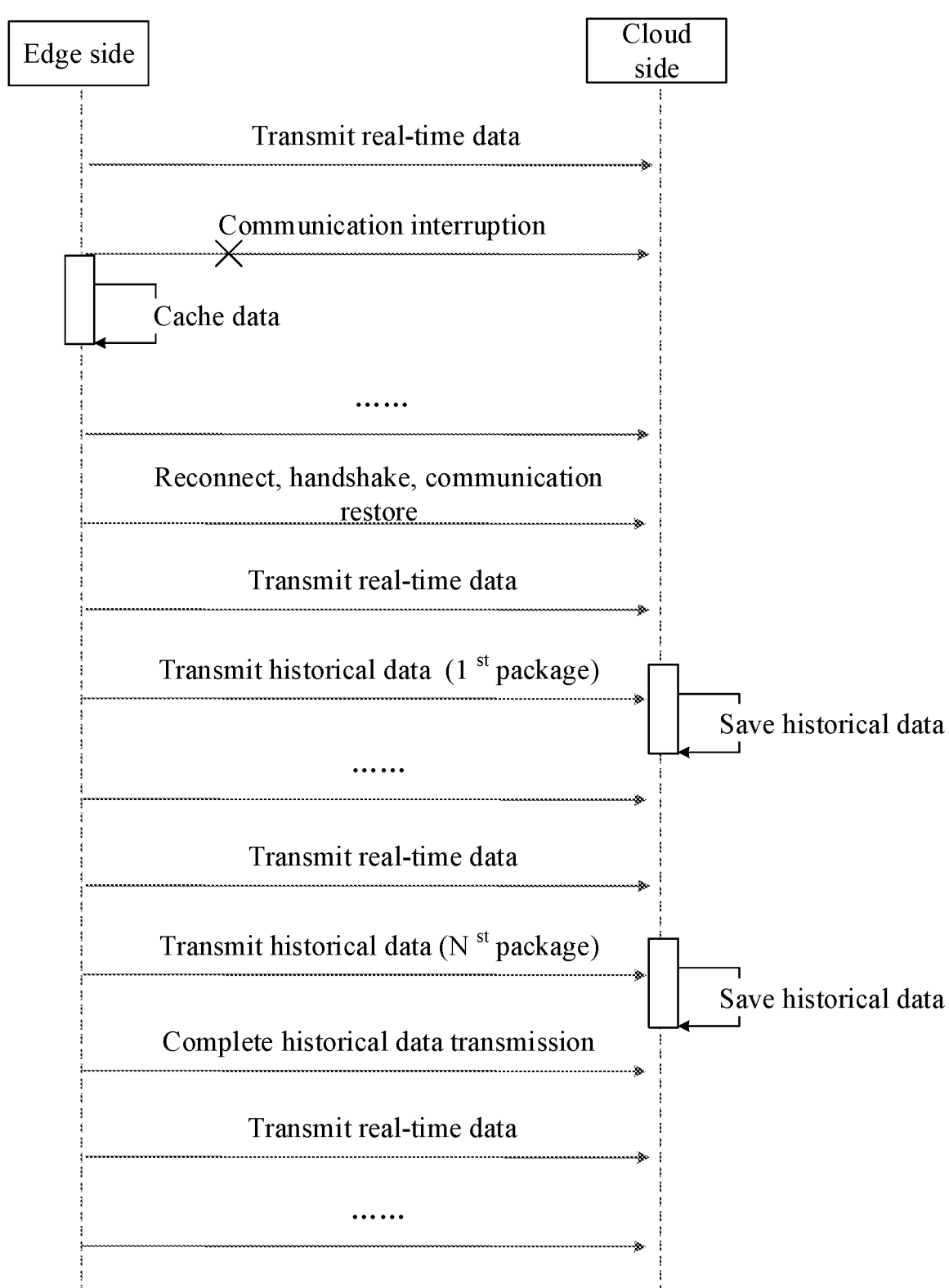
FIG. 3 is an interaction diagram of a process of breakpoint saving of cloud-edge data transmission according to an embodiment.

To make the objectives, technical solutions, and advantages of the present disclosure clearer and more comprehensible, the following further describes the present disclosure in detail with reference to the accompanying drawings and embodiments. It should be understood that the specific embodiments described herein are only used to explain the present disclosure and are not intended to limit the present disclosure.

In an embodiment, as shown in FIG. 1, a method for cloud-edge data transmission of an electrochemical energy storage station is provided. In the present embodiment, the method is applied to an edge node as an example, including the following steps.

In step S110, a communication status between the edge node and a cloud node is detected; and in a case where abnormal communication is detected between the edge node and the cloud node, first data to be transmitted is cached, and a connection re-establishment request is sent to a cloud node.

The edge node may be an edge side device in a cloud-edge communication of the electrochemical energy storage station, and is, for example, an edge gateway or an edge server.

The cloud node may be a cloud side device in the cloud-edge communication of the electrochemical energy storage station, and is, for example, a cloud server.

The abnormal communication may be communication interruption.

The first data may be data required to be transmitted by the edge node to the cloud node during the abnormal communication of the cloud-edge communication.

In a specific implementation, the edge node may detect a communication status between the edge node and the cloud node, and when the abnormal communication is detected, the first data required to be transmitted to the cloud node is cached in an edge node database, and at the same time, the connection re-establishment request may also be sent to the cloud node so as to re-establish a communication connection with the cloud node.

For example, when the intelligent gateway detects that there is no response to the heartbeat data packet sent from the intelligent gateway to the cloud side, or a connection of an MQTT service is disconnected, it is determined that the cloud-edge communication is interrupted, the intelligent gateway may automatically save all the data required to be transmitted to the cloud side during the communication interruption, and persist these data into an intelligent gateway database, so as to cache the data. At the same time, the intelligent gateway may also attempt to re-establish a connection with the cloud side.

In step S120, in the case where a re-establishment acknowledgement message returned by the cloud node in response to the connection re-establishment request is received, second data to be transmitted is sent to the cloud node; the second data follows the first data and corresponds to a first period.

The re-establishment acknowledgement message may be a message that the cloud node confirms to re-establish a connection with the edge node.

The second data may be data required to be transmitted by the edge node to the cloud node after the cloud-edge communication is restored.

The first period may be a transmission period of the second data.

In a specific implementation, after the cloud node has received a connection re-establishment request sent by the edge node, if it is determined to establish the communication connection with the edge node, the edge node may return a re-establishment acknowledgement message to the edge node, and after the edge node has received the re-establishment acknowledgement message returned by the cloud node, the second data required to be transmitted to the cloud node may be directly sent to the cloud node after the communication connection is re-established. The period for transmitting the second data is the first period. The second data directly sent to the cloud node may carry a real-time data identifier. The cloud node may identify the received data, and when it is identified that the data carries real-time data identifier, it is determined that the data is the second data, and then the second data is stored in the real-time database.

For example, after the cloud-edge communication is restored, the intelligent gateway may transmit real-time data in a "real-time data up-sending" theme to the cloud side based on the MQTT protocol.

In step S130, the cached first data is sent to the cloud node in an idle period after the first period.

The idle period may be a period after the second data transmission is completed.

In a specific implementation, after the second data transmission is completed, the edge node may acquire, in a subsequent idle period, the first data cached in the database, and send the first data to the cloud node. The first data sent to the cloud node in the idle period may carry a historical data identifier. The cloud node may identify the received data, and when it is identified that the data carries the historical data identifier, it is determined that the data is the first data, and the first data is then stored in the historical database.

For example, after the cloud-edge communication is restored, the intelligent gateway may transmit the real-time data in the "real-time data up-sending" theme to the cloud side based on the MQTT protocol, and may also transmit, to the cloud side in a "cached data up-sending" theme in the idle period, the data cached in the database when the cloud-edge communication is interrupted. The cloud side receives intelligent gateway data via a unified front-end processor port, and parsing the received intelligent gateway data to obtain a data identifier of the intelligent gateway data. If the data identifier is "real-time data up-sending", it is determined that the intelligent gateway data is real-time up-sending data, and the intelligent gateway data is then stored in the real-time database, and is displayed in real time; otherwise, if the data identifier is "cached data up-sending", it is determined that the intelligent gateway data is cached supplement sending data, and the intelligent gateway data is then stored in the historical database.

In step S140, a working condition is detected; in a case where abnormal working condition of the edge node is detected, a characteristic value of third data to be transmitted is determined, the characteristic value is sent to the cloud node, and a non-characteristic value apart from the characteristic value is cached; in a case where a restored working condition of the edge node is detected, fourth data to be transmitted is sent to a cloud node; the fourth data follows the third data and corresponds to the second period; and a non-characteristic value of the third data is sent to the cloud node in an idle period after the second period.

The abnormal working condition may be a working condition transition phase or a fault condition.

The third data may be data required to be transmitted by the edge node to the cloud node during an abnormal working condition of the edge node.

The characteristic value may be a preset key characteristic of the electrochemical energy storage station, and for example, may be electricity consumption amount, power generation amount or the like. The non-characteristic value may be a characteristic other than the key characteristic of the electrochemical energy storage station.

The fourth data may be data required to be transmitted by the edge node to the cloud node after the working condition of the edge node is restored.

The second period may be a transmission period of the fourth data.

In a specific implementation, the edge node may detect the working condition. If the abnormal working condition is detected, a characteristic value can be determined for the third data to be transmitted, only the characteristic value of the third data is sent to the cloud node, and the non-characteristic values apart from characteristic value is then cached in the edge node database. If the restored working condition is detected, the edge node may send the fourth data required to be transmitted to the cloud node in full amount. The transmission period of the fourth data is the second period. The non-characteristic value of the third data cached in the edge node database may be sent to the cloud node in the idle period after the second period.

For example, a characteristic value in the MQTT protocol may be defined to distinguish individual themes, and the configuration of the key characteristic value is completed before the intelligent gateway is shipped from a factory. When the electrochemical energy storage station is in a working condition transition process or a fault condition, monitored data changes frequently, changing bit data is relatively large, and the amount of information increases, which easily causes load of a transmission channel and data transmission blockage. In this case, an intelligent gateway does not up-send a full amount of real-time data, only data of a characteristic value theme is up-sent, and at the same time, other data that is not up-sent is saved by means of a breakpoint saving capability. When the electrochemical energy storage station is in a stable operating working condition or a shutdown standby state, the intelligent gateway transmits a full amount of real-time data required for supporting algorithm training or cloud side trend analysis, and at the same time, by means of the breakpoint saving capability and MQTT protocol supplement transmission, transmits data that has not been uploaded during the working condition transition or the fault condition.

According to the cloud-edge data transmission of the electrochemical energy storage station, in the case where the abnormal communication is detected between the edge node and the cloud node, first data to be transmitted is cached, and the connection re-establishment request is sent to a cloud node; and in the case where the re-establishment acknowledgement message returned by the cloud node in response to the connection re-establishment request is received, the second data to be transmitted is sent to the cloud node. The second data follows the first data and corresponds to the first period. The cached first data is sent to the cloud node in the idle period after the first period. After that, the working condition is detected. In the case where the abnormal working condition of the edge node is detected, the characteristic value of third data to be transmitted is determined, the characteristic value is sent to the cloud node, and the non-characteristic value apart from the characteristic value is cached. In the case where it is detected that the working condition of the edge node is restored, the fourth data to be transmitted is sent to the cloud node. The fourth data follows the third data and corresponds to the second period. The non-characteristic value of the third data is sent to the cloud node in the idle period after the second period. The communication condition and the working condition of the edge node of the electrochemical energy storage station can be detected successively. When the cloud-edge communication is abnormal, the first data to be transmitted is cached in the edge node, and the request to re-establish a communication connection between cloud and edge is made at the same time. When the communication connection is successfully re-established, the real-time second data is transmitted, and the first data previously cached is transmitted in the idle period after the second data is transmitted. Only the characteristic value of high importance may be transmitted when the working condition of the edge node is abnormal, and the non-characteristic value with relatively low importance is transmitted in the idle period after the working condition is restored, thereby realizing resuming transmission of the breakpoint of cloud-edge communication, and switching different transmission modes according to a load condition of a transmission channel, so as to ensure data transmission performance, and improve the reliability of the cloud-edge data transmission of the electrochemical energy storage station.

In an embodiment, the first data packet includes at least one data packet; the step S130 may specifically include: determining, in the idle period, a target data packet from the at least one data packet; and sending the target data packet to the cloud node.

The target data packet may be the first data transmitted in the current idle period.

In a specific implementation, all first data cached in the edge node database during a period of abnormal communication of the cloud-edge communication can be divided into at least one data packet, and the data packets are arranged in sequence; after cloud-edge communication is restored, in each idle period of real-time data transmission, the edge node may determine the target data packet according to a sequence of arrangement of the data packets, and send the target data packet to the cloud node.

For example, the historical data required to be transmitted to the cloud side during the abnormal communication of the cloud-edge communication is divided into N data packets: a first packet, a second packet, . . . , an N-th packet, and they are successively cached in the intelligent gateway database. After the cloud-edge communication is restored, the first packet is transmitted in a first idle period of the real-time data transmission, the second packet is transmitted in a second idle period of the real-time data transmission, . . . , and the N-th data packet is transmitted in an N-th idle period of the real-time data transmission. After the transmission of the N data packets is completed, the intelligent gateway may also send a historical data transmission completion signal to the cloud side, after which no historical data need to be transmitted during idle periods.

In this embodiment, the target data packet is determined from at least one data packet in the idle period; and the target data packet is sent to the cloud node, so that first data cached in the edge node database can be sequentially transmitted in each idle period after the cloud-edge communication is restored, thereby ensuring reliable transmission of the first data and improving the reliability of cloud-edge data transmission.

In an embodiment, the second data carries a real-time data identifier, and the first data carries a historical data identifier. The cloud node is provided with a real-time database and a historical database. The real-time database is configured to store the second data, and the historical database is configured to store the first data.

In a specific implementation, the second data transmitted by the edge node to the cloud node may carry the real-time data identifier, the first data transmitted by the edge node to the cloud node may carry the historical data identifier, and the real-time database and the historical database are provided at the cloud node. The cloud node identifies the received edge node data, and when it is identified that the edge node data carries the real-time data identifier, then it is determined that the edge node data is the second data, and the edge node data is then stored in the real-time database; otherwise, when it is identified that the edge node data carry the historical data identifier, it is determined that the edge node data is the first data, and the edge node data is then stored in the historical database.

For example, after the cloud-edge communication is restored, based on the MQTT protocol, the real-time data transmitted by the intelligent gateway to the cloud side is identified by the "real-time data up-sending" theme, and cached data transmitted by the intelligent gateway to the cloud side in the idle period is identified by a "cached data up-sending" theme. After receiving the data sent by the intelligent gateway, the cloud side parses the data; if the parsed data is real-time up-sending data, the data is then stored in the real-time database, and is displayed in real time; and if the parsed data is cached supplement sending data, the data is then stored in a historical database.

In this embodiment, the second data carries the real-time data identifier, and the first data carries the historical data identifier. The cloud node is provided with the real-time database and the historical database. The real-time database is configured to store second data, and the historical database is configured to store first data, so that the cloud node can identify the received data, and respectively store the received real-time data and historical data in different databases, thereby improving the availability of the received data.

In an embodiment, the cloud node identifies the received data, stores the data in the real-time database when it is identified that the data carries the real-time data identifier, and stores the data in the historical database when it is identified that the data carries the historical data identifier.

In a specific implementation, the cloud node is provided with the real-time database and the historical database. The cloud node identifies the received edge node data. When it is identified that the edge node data carries the real-time data identifier, it is determined that the edge node data is the second data, and the edge node data then stored in the real-time database; otherwise, when it is identified that the edge node data carries the historical data identifier, it is determined that the edge node data is the first data, and the edge node data is then stored in the historical database.

In this embodiment, the cloud node identifies received data, stores the data in the real-time database when it is identified that the data carries the real-time data identifier, and stores the data in the historical database when it is identified that the data carries the historical data identifier. In this way, the cloud node can respectively store the received real-time data and historical data in different databases, thereby improving the availability of received data.

In an embodiment, the method further includes: determining a point list difference between an edge node point list and a preset electrochemical energy storage station point list in response to a check request for point lists; and synchronously updating the edge node point list according to the electrochemical energy storage station point list in a case where the point list difference satisfies a first preset condition.

The point list may be an electrochemical energy storage station monitoring point list.

The edge node point list may be a monitoring point list stored in the edge node, and the electrochemical energy storage station point list may be a monitoring point list provided in the electrochemical energy storage system.

The first preset condition may be that the point list difference exceeds a preset difference value.

In a specific implementation, the check request for the point lists may be sent to the edge node. When the edge node receives the check request, the preset electrochemical energy storage station point list is acquired, and the electrochemical energy storage station point list is compared with the edge node point list to obtain the point list difference. If the point list difference does not exceed a preset difference value, it is not necessary to update the edge node point list; otherwise, if the point list difference exceeds the preset difference value, the edge node point list is synchronously updated according to the electrochemical energy storage station point list.

For example, in order to ensure consistency between the monitoring point lists for the edge and cloud, a change of the edge side monitoring point list is notified to the cloud side in time, so that cloud-edge communication can have a monitoring point list checking capability. The checking operation mainly includes the followings.

1. The comparison of the plant monitoring system point list and the gateway communication point list is periodically or manually triggered at the edge side. The plant monitoring system point list is taken as a reference. The same monitoring point ID (Identity Document, identity) is found by looking up the gateway communication point list based on each monitoring point ID of the plant monitoring system point list successively. The monitoring point description, the upper and lower limit threshold values and the alarm level information about the same monitoring point ID in the two monitoring point lists are compared. If there are different records, the difference monitoring point ID and the corresponding information in both sides are recorded in a report in a classified manner. The monitoring point ID which cannot be found in the gateway communication point list (namely, the monitoring point ID which is found in the plant monitoring system point list but not found in the gateway communication point list) and the monitoring point ID which is not found in the gateway communication point list (namely, the monitoring point ID which in not found in the plant monitoring system point list but found in the gateway communication point list) are recorded in the report in a classified manner. The report is then pushed to the edge system by means of a sftp (SSH File Transfer Protocol, an SSH file transfer protocol) or other methods. The specific process includes: (1) the in-station operation and maintenance personnel manually initiate a point list check request at the edge station control system; and (2) the intelligent gateway requests the plant system for the point list, compares the differences, and synchronizes the plant system point list after being confirmed by operation and maintenance personnel.

2. The comparison of the gateway communication point list and the cloud side monitoring point list is periodically or manually triggered at the cloud side. The gateway communication point list is taken as a reference. The same monitoring point ID is found by looking up the cloud side monitoring point list based on each monitoring point ID of the gateway communication point list successively. The monitoring point description, the upper and lower limit threshold values and the alarm level information about the same monitoring point ID in the two monitoring point lists are compared. If there are different records, the difference monitoring point ID and the corresponding information in both sides are record in a report in a classified manner. The monitoring point ID which cannot be found in the cloud side monitoring point list (namely, the monitoring point ID which is found in the gateway communication point list but not found in the cloud side monitoring point list) and the monitoring point ID which is not found in the cloud side monitoring point list (namely, the monitoring point ID which is not found in the gateway communication point list but found in the cloud side monitoring point list) are recorded in the report in a classified manner. The report is then pushed to the cloud side system as an alarm detail. The specific process includes: (1) the platform operation and maintenance personnel manually initiate a point list check request at the cloud platform; and (2) the cloud side system requests the intelligent gateway for the point list, and compares the differences. The cloud side system synchronizes the intelligent gateway point list after being confirmed by operation and maintenance personnel.

In this embodiment, the point list difference between the edge node point list and the preset electrochemical energy storage station point list is determined in response to the check request for the monitoring point list. In the case where the point list difference satisfies the first preset condition, the edge node point list is updated synchronously according to the electrochemical energy storage station point list. In this way, the consistency between the monitoring point lists for the cloud and edge can be ensured, and further the reliability of cloud-edge communication can be ensured.

In an embodiment, the method further includes: receiving a configuration parameter of the electrochemical energy storage station sent by the cloud node; performing parameter configuration on the electrochemical energy storage station according to the configuration parameter of the electrochemical energy storage station, so as to obtain a parameter configuration result of the electrochemical energy storage station; and returning the parameter configuration result to the cloud node.

The configuration parameter of the electrochemical energy storage station includes, but is not limited to, an algorithm, a threshold, a constant value or the like of the electrochemical energy storage station.

The parameter configuration result includes, but is not limited to, specific numerical values of the algorithm, the threshold, the constant value or the like of the electrochemical energy storage station.

In a specific implementation, the cloud node may deliver the configuration parameter of the electrochemical energy storage station to the edge node, and the edge node performs parameter configuration according to the received configuration parameter of the electrochemical energy storage station, and reports the obtained parameter configuration result to the cloud node.

For example, the cloud side defines numerical values of the algorithm, the threshold, the constant value or the like of the electrochemical energy storage station, and delivers the defined algorithm, threshold value, constant value or the like to the edge side. The edge side performs configuration in response to the delivery and up-sends the configuration result.

In this embodiment, the configuration parameter of the electrochemical energy storage station sent by the cloud node is received; parameter configuration is performed on the electrochemical energy storage station according to the configuration parameter of the electrochemical energy storage station, so as to obtain the parameter configuration result of the electrochemical energy storage station. The parameter configuration result is returned to the cloud node. In this way, the edge node can perform parameter configuration according to the configuration parameter of the cloud node, thereby ensuring consistency of the numerical values of the algorithm, the threshold, the constant value or the like of the cloud and the edge, and improving reliability of cloud-edge communication.

In an embodiment, the method further includes: after the step of returning the parameter configuration result to the cloud node, acquiring the configuration parameters of the electrochemical energy storage station from the cloud node; determining a parameter configuration difference between the edge node and the cloud node according to the configuration parameter of the electrochemical energy storage station; and returning to the step of receiving the configuration parameters of the electrochemical energy storage station sent by the cloud node in a case where the parameter configuration difference satisfies a second preset condition.

The second preset condition may be that the parameter configuration difference exceeds a preset difference value.

In a specific implementation, the edge node may periodically request the configuration parameters of the electrochemical energy storage station from the cloud node. The cloud node delivers the current configuration parameter of the electrochemical energy storage station to the edge node after receiving the request from the edge node. The edge node triggers configuration parameter comparison, and determine the parameter configuration difference between the configuration parameter of the electrochemical energy storage station at the edge node and the configuration parameter of the electrochemical energy storage station delivered in real time by the cloud node. If the parameter configuration difference does not exceed the preset difference value, the configuration parameter of the electrochemical energy storage station at the edge node does not need to be updated; otherwise, if the parameter configuration difference exceeds the preset difference value, the step of receiving the configuration parameter of the electrochemical energy storage station sent by the cloud node is returned to, and performing parameter configuration again according to the configuration parameter of the electrochemical energy storage station delivered by the cloud node, and then the obtained parameter configuration result is returned to the cloud node.

For example, the edge side periodically requests the definitions of the numerical values of the algorithm, the threshold value, the constant value or the like of the electrochemical energy storage station. The cloud side delivers the defined algorithm, threshold value, constant value or the like to the edge side after receiving the request. The edge side periodically or manually triggers comparison between the numerical values of the cloud side and the edge side, and records a difference between the numerical values of the two sides and feeds back the same.

In this embodiment, the configuration parameter of the electrochemical energy storage station is acquired from the cloud node; the parameter configuration difference between the edge node and the cloud node is determined according to the configuration parameter of the electrochemical energy storage station; in the case where the parameter configuration difference satisfies the second preset condition, the step of receiving configuration parameters of the electrochemical energy storage station sent by the cloud node is returned to. In this way, the configuration parameter of the electrochemical energy storage station can be updated in real time, thereby ensuring the consistency of the configuration parameters of the cloud and the edge and improving the reliability of cloud-edge communication.

In an embodiment, as shown in FIG. 2, a method for cloud-edge data transmission of an electrochemical energy storage station is provided. In the present embodiment, the method is applied to a cloud node as an example, including the following steps.

In step S210, edge data sent by an edge node is received, and the edge data is identified;

In step S220, the edge data is stored in a real-time database in a case where it is identified that the edge data is second data;

In step S230, the edge data is stored in a historical database in a case where it is identified that the edge data is first data.

In a specific implementation, the cloud node may identify the received edge data. when it is identified that the edge data carries a real-time data identifier, it is determined that the edge data is the second data, and the edge data is then stored in a real-time database; and when it is identified that the edge data carries a historical data identifier, it is determined that the edge data is the first data, and the edge data is then stored in the historical database.

The real-time data identifier may be used for marking the edge data transmitted in real time to the cloud node during a normal communication of the cloud-edge communication.

The historical data identifier may be used for marking edge data cached in an edge node during an interruption communication of the cloud-edge communication.

According to the method for cloud-edge data transmission of the electrochemical energy storage station, the edge data sent by an edge node is received, and the edge data is identified; in the case where it is identified that the edge data is the second data, the edge data is then stored in the real-time database; and in the case where it is identified that the edge data is the first data, the edge data is then stored in the historical database. In this way, the cloud node may acquire an identification result that the edge data is real-time data or cached data, and store the edge data in different databases respectively according to the identification result, thereby improving the availability of the edge data.

In order to facilitate a person skilled in the art to deeply understand the embodiments of the present disclosure, a specific example will be described below.

The cloud-edge data transmission of the electrochemical energy storage station may suffer from problems such as transmission interruption and data loss due to network fluctuations, transmission channel load, etc., and cannot provide reliable data transmission. In this regard, a breakpoint saving capability, a transmission mode switching capability according to a transmission channel load condition, a monitoring point list checking capability, and a data delivering capability can be designed for the cloud-edge data transmission of the electrochemical energy storage station.

FIG. 3 provides an interaction diagram of a process of breakpoint saving of the cloud-edge data transmission. According to FIG. 3, the breakpoint saving capability mainly includes the followings:

1. when the communication is normal, the intelligent gateway transmits real-time data in a "real-time data up-sending" theme to the cloud side based on an MQTT (Message Queuing Telemetry Transport) protocol;

2. when the cloud-edge communication is interrupted, for example, when there is no response to the sent heartbeat packet, or a connection of an MQTT service is disconnected, the intelligent gateway automatically saves all the data required to be transmitted to the cloud side during the communication interruption, persists the data into a gateway database so as to cache the data, and attempts to re-establish a connection with the cloud side;

3. after communication is restored, the intelligent gateway performs real-time data transmission to the cloud side, and at the same time, transmits, in an idle period, the data saved during communication interruption to the cloud side in a "cached data up-sending" theme;

4. the cloud side receiving intelligent gateway data forwarded by an energy storage big data convergence platform via a unified front-end processor port;

5. after receiving data, the cloud side parses a data identifier, and when it is determined that real-time up-sending data, stores the data in a real-time database, and displays same in real time; when it is determined that it is cached supplement sending data, stores the data directly in the historical database.

Figure 4:
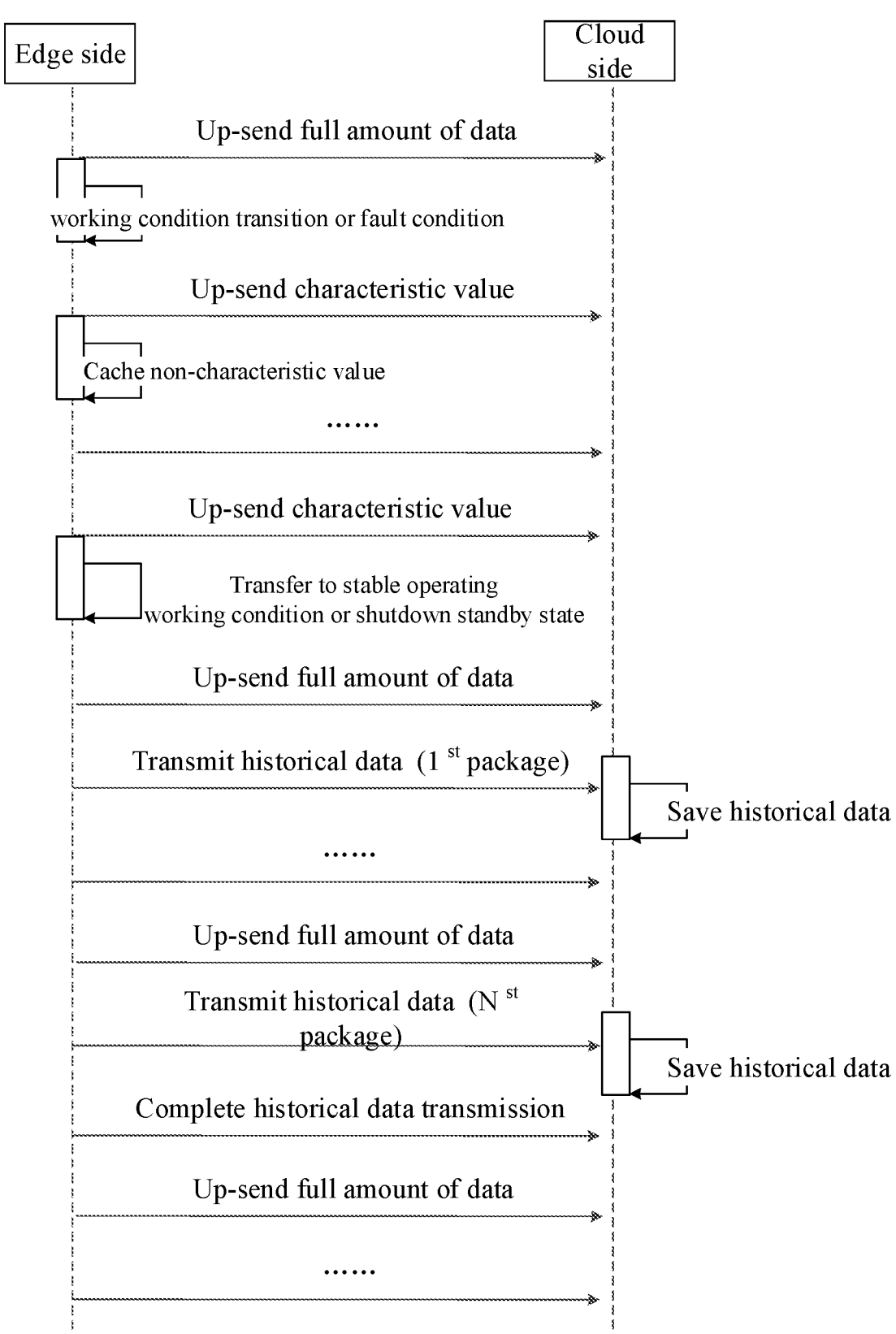
FIG. 4 is an interaction diagram of a process of transmission mode switching for cloud-edge data transmission according to an embodiment.

FIG. 4 provides an interaction diagram of a process of transmission mode switching for cloud-edge data transmission. According to FIG. 4, when the cloud-edge data transmission is performed, different transmission modes may be adopted according to different situations, including but not limited to the following processes:

1. a key characteristic value in an MQTT protocol is defined to distinguished individual themes, and the configuration of the key characteristic value is completed before the intelligent gateway is shipped from a factory.

2. when the electrochemical energy storage station is in a working condition transition process or a fault condition, at this time, monitored data changes frequently, changing bit data is relatively large, and the amount of information is increased, which easily causes load of a transmission channel and data transmission blockage. The intelligent gateway does not up-send a full amount of real-time data, only data of a characteristic value theme is up-sent, and at the same time, other data that is not sent is saved by means of a breakpoint saving capability;

3. when the electrochemical energy storage station is in a stable working condition or a shutdown standby state, the intelligent gateway transmits a full amount of real-time data required for supporting algorithm training or cloud side trend analysis, and at the same time, by means of the breakpoint saving capability and MQTT protocol supplement transmission, transmits data that has not been uploaded during the working condition transition or the fault condition;

4. Data transmission in the above situations should have the breakpoint saving capacity to realize data supplement transmission.

In order to ensure consistency between the monitoring point lists for the edge and cloud, and to notify the cloud side of a change of the edge side monitoring point list in time, a monitoring point list checking capability needs to be provided. The checking operation includes both of checking the monitoring point list at the edge side and checking the monitoring point list at the cloud side.

Figure 5:
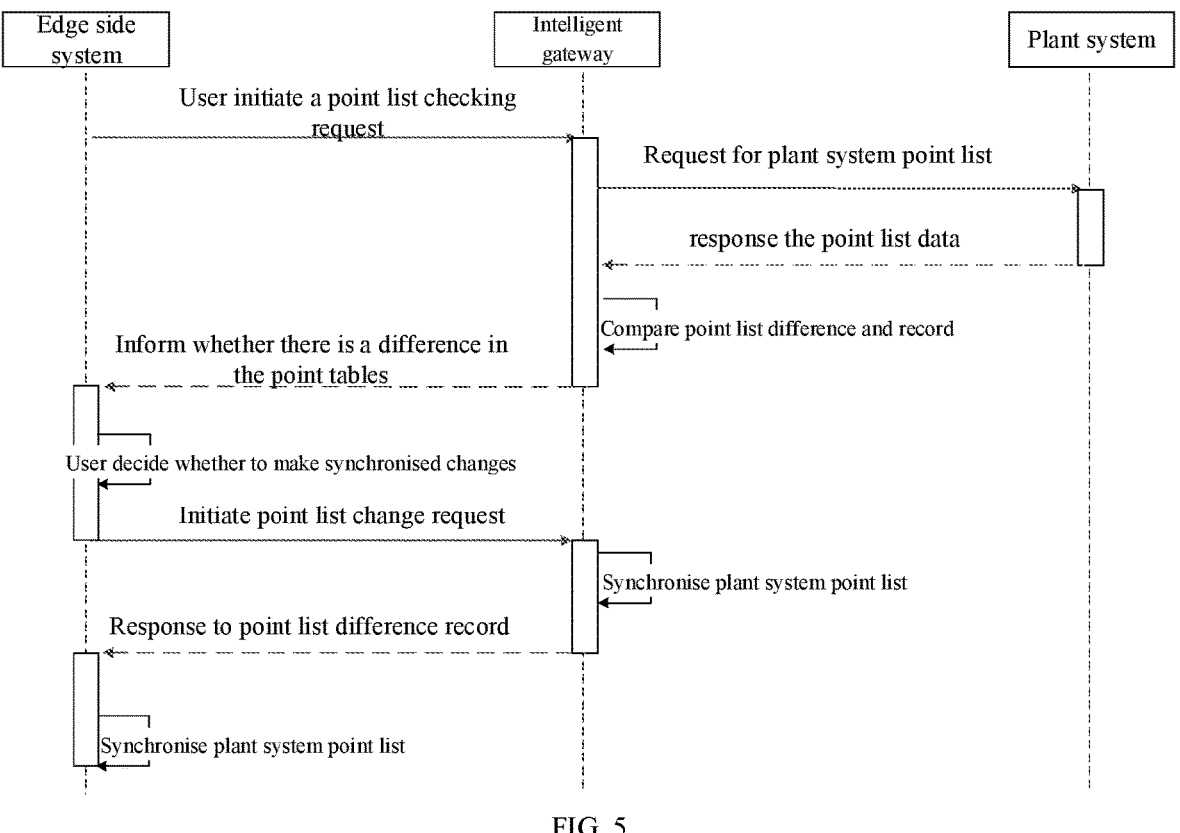
FIG. 5 is an interaction diagram of a process of monitoring point list checking at an edge side according to an embodiment.

FIG. 5 provides an interaction diagram of a process of monitoring point list checking at the edge side. According to FIG. 5, The comparison of the plant monitoring system point list and the gateway communication point list can be periodically or manually triggered at the edge side. The plant monitoring system point list is taken as a reference. The same monitoring point ID is found by looking up the gateway communication point list based on each monitoring point ID of the plant monitoring system point list successively. The monitoring point description, the upper and lower limit threshold values and the alarm level information about the same monitoring point ID in the two monitoring point lists are compared. If there are different records, the difference monitoring point ID and the corresponding information in both sides are recorded in a report in a classified manner. The monitoring point ID which cannot be found in the gateway communication point list (namely, the monitoring point ID which is found in the plant monitoring system point list but not found in the gateway communication point list) and the monitoring point ID which is not found in the gateway communication point list (namely, the monitoring point ID which in not found in the plant monitoring system point list but found in the gateway communication point list) are recorded in the report in a classified manner. The report is then pushed to the edge system by means of the sftp or other methods. The main process includes:

1. the in-station operation and maintenance personnel manually initiate a point list check request at the edge station control system; and 2. the intelligent gateway requests the plant system for the point list, compares the differences, and synchronizes the plant system point list after being confirmed by operation and maintenance personnel.

Figure 6:
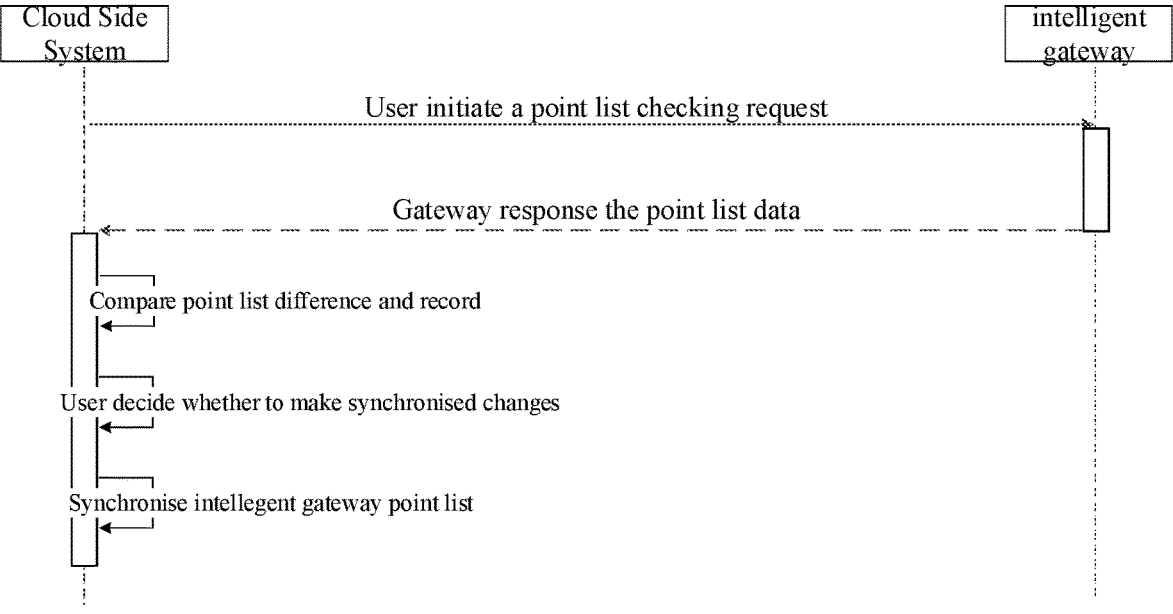
FIG. 6 is an interaction diagram of a process of monitoring point list checking at a cloud side according to an embodiment.

FIG. 6 provides an interaction diagram of a process of monitoring point list checking at the cloud side. According to FIG. 6, the comparison of the gateway communication point list and the cloud side monitoring point list can also be periodically or manually triggered at the cloud side. The gateway communication point list is taken as a reference. The same monitoring point ID is found by looking up the cloud side monitoring point list based on each monitoring point ID of the gateway communication point list successively. The monitoring point description, the upper and lower limit threshold values and the alarm level information about the same monitoring point ID in the two monitoring point lists are compared. If there are different records, the difference monitoring point ID and the corresponding information in both sides are record in a report in a classified manner. The monitoring point ID which cannot be found in the cloud side monitoring point list (namely, the monitoring point ID which is found in the gateway communication point list but not found in the cloud side monitoring point list) and the monitoring point ID which is not found in the cloud side monitoring point list (namely, the monitoring point ID which is not found in the gateway communication point list but found in the cloud side monitoring point list) are recorded in the report in a classified manner. The report is then pushed to the cloud side system as an alarm detail. The main process includes:

1. the platform operation and maintenance personnel manually initiate a point list check request at the cloud platform; and
2. the cloud side system requests the intelligent gateway for the point list, and compares the differences. The cloud side system synchronizes the intelligent gateway point list after being confirmed by an operation and maintenance personnel.

Figure 7:
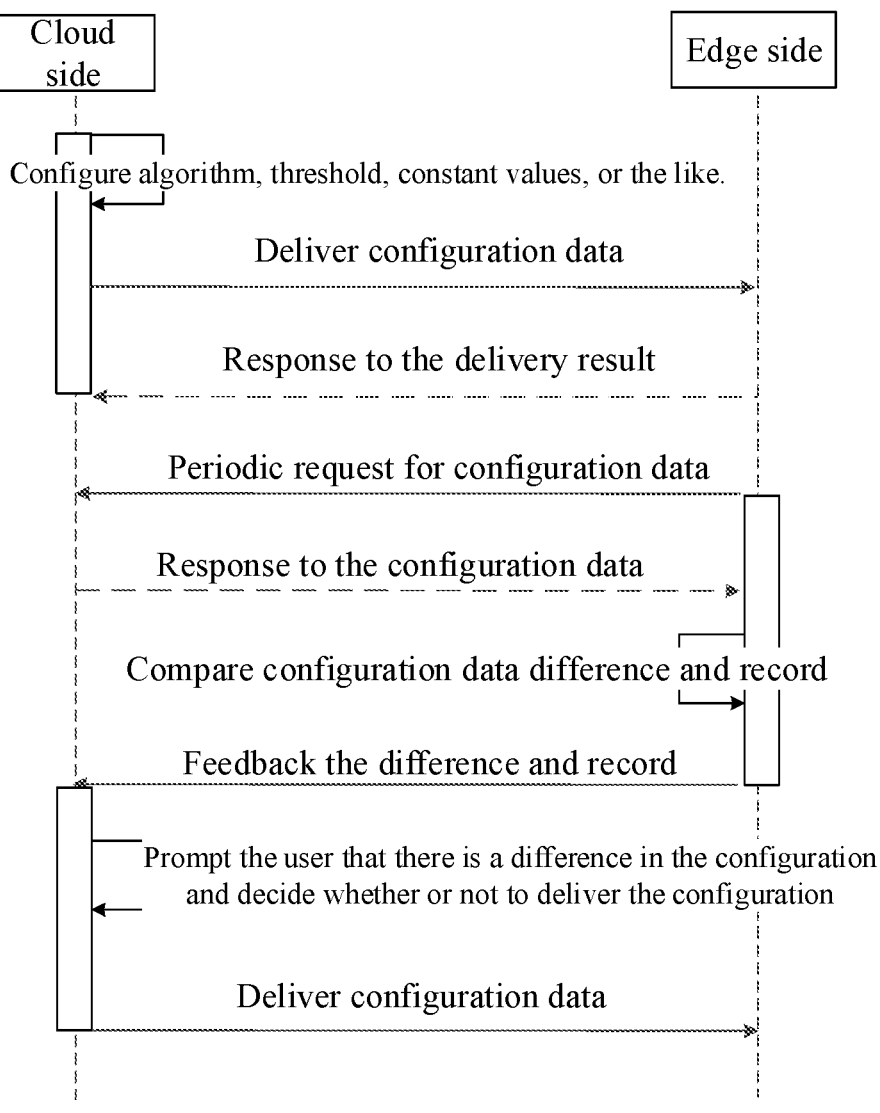
FIG. 7 is an interaction diagram of a process of data delivering of cloud-edge data transmission according to an embodiment.

FIG. 7 provides an interaction diagram of a process of data delivering of cloud-edge data transmission. According to FIG. 7, in order to ensure consistency of numerical values of the algorithm and the threshold of the cloud and edge, a data delivering capability needs to be provided, and specific requirements are as follows:

1. The cloud side actively deliver the data, mainly including:
a. the cloud side defines numerical values of the algorithm, the threshold value, the constant value, or the like of the electrochemical energy storage station; and
b. the cloud side delivers the defined algorithm, threshold value, constant value, or the like to the edge side, and the edge side performs configuration in response to the delivery and up-sends the configuration result.
2. The edge side periodically requests the definitions, mainly including:
a. the edge side periodically requests the definitions of the numerical values of the algorithm, the threshold value, the constant value or the like of the electrochemical energy storage station;
b. the cloud side delivers the defined algorithm, threshold value, constant value or the like to the edge side after receiving the request; and
c. the edge side periodically or manually triggers comparison between the numerical values of the cloud side and the edge side, and records a difference between the numerical values of the two sides and feeds back the same.

The above-mentioned processes of breakpoint saving, transmission mode switching, monitoring point list checking and data delivering can prevent transmission interruption, data loss and inconsistency of cloud and edge data caused in the process of cloud-edge data transmission, improve the reliability of cloud-edge data transmission of the electrochemical energy storage power station, and improve the accuracy rate of algorithm diagnosis and analysis functions.

It should be understood that, although the steps in the flowcharts involved in the foregoing embodiments are shown in sequence according to the indication of the arrows, the steps are not necessarily executed in sequence according to the indication of the arrows. Unless otherwise specified herein, the steps are performed in no exact order, and the steps may be performed in other orders. Furthermore, at least a part of the steps in the flowcharts involved in the embodiments as stated above may include a plurality of steps or a plurality of stages. These steps or stages are not necessarily completed at the same period, but may be performed at different periods. The order in which the steps or phases are performed is also not necessarily sequential, but may be performed in rotation or alternately with at least a part of the steps or stages in other steps or other stages.

Based on the same inventive concept, an embodiment of the present disclosure further provides an apparatus for cloud-edge data transmission of an electrochemical energy storage station to implement the described related method for cloud-edge data transmission of an electrochemical energy storage station. The solution for solving the problem provided by the apparatus is similar to the solution disclosed in the described method, and therefore, for the specific limitation in one or more embodiments of the apparatus for cloud-edge data transmission of the electrochemical energy storage station provided below, reference can be made to the limitation to the method for cloud-edge data transmission of the electrochemical energy storage station mentioned above, which will not be repeated herein.

Figure 8:
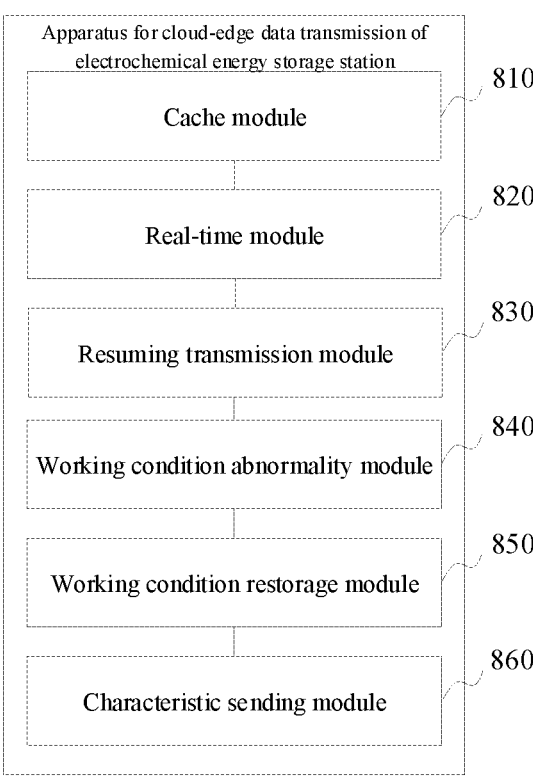
FIG. 8 is a structural block diagram of a cloud-edge data transmission apparatus for an electrochemical energy storage station according to an embodiment.

In an embodiment, as shown in FIG. 8, an apparatus for cloud-edge data transmission of an electrochemical energy storage station is provided, including: a cache module 810, a real-time module 820, a resuming transmission module 830, a working condition abnormality module 840, a working condition restorage module 850 and a characteristic sending module 860.

The cache module 810 is configured to detect a communication status between an edge node and a cloud node, and cache the first data to be transmitted and send a connection re-establishment request to the cloud node in a case where abnormal communication is detected between the edge node and the cloud node.

The real-time module 820 is configured to send to the cloud node second data to be transmitted in a case where a re-establishment acknowledgement message returned by the cloud node in response to the connection re-establishment request is received. The second data follows the first data and corresponds to a first period.

The resuming transmission module 830 is configured to send the cached first data to the cloud node in an idle period after the first period.

The working condition abnormality module 840 is configured to detect a working condition, and determine a characteristic value of third data to be transmitted, send the characteristic value to the cloud node, and cache a non-characteristic value apart from the characteristic value in the case where an abnormal working condition of the edge node is detected.

The working condition restorage module 850 is configured to send to the cloud node fourth data to be transmitted in a case where a restored working condition of the edge node is detected. The fourth data follows the third data and corresponds to the second period.

The characteristic sending module 860 is configured to send the non-characteristic value of the third data to the cloud node in an idle period after the second period.

In an embodiment, the resuming transmission module 830 is further configured to determine, in the idle period, a target data packet from the at least one data packet; and send the target data packet to the cloud node.

In an embodiment, the second data carries a real-time data identifier, and the first data carries historical data identifier; the cloud node is provided with a real-time database and a historical database; and the real-time database is configured to store the second data, and the historical database is configured to store the first data.

In an embodiment, the cloud node identifies the received data, stores the data in the real-time database when it is identified that the data carries the real-time data identifier, and stores the data in the historical database when it is identified that the data carries the historical data identifier.

In an embodiment, the apparatus for the cloud-edge data transmission of the electrochemical energy storage station further includes: a checking request module configured to determine a point list difference between an edge node point list and a preset electrochemical energy storage station point list in response to a check request for point lists; and a point list updating module configured to synchronously update the edge node point list according to the electrochemical energy storage station point list in a case where the point list difference satisfies a first preset condition.

In an embodiment, the apparatus for the cloud-edge data transmission of the electrochemical energy storage station further includes: a parameter receiving module configured to receive a configuration parameter of the electrochemical energy storage station sent by the cloud node; a parameter configuration module configured to perform parameter configuration on the electrochemical energy storage station according to the configuration parameter of the electrochemical energy storage station, so as to obtain a parameter configuration result of the electrochemical energy storage station; and a result returning module configured to return the parameter configuration result to the cloud node.

In an embodiment, the apparatus for the cloud-edge data transmission of the electrochemical energy storage station further includes: a parameter acquiring module configured to acquire the configuration parameter of the electrochemical energy storage station from the cloud node; a difference determining module configured to determine a parameter configuration difference between the edge node and the cloud node according to the configuration parameter of the electrochemical energy storage station; and a parameter updating module configured to return to the step of receiving the configuration parameter of the electrochemical energy storage station sent by the cloud node in a case where the parameter configuration difference satisfies a second preset condition.

All or a part of the modules in the foregoing apparatus for the cloud-edge data transmission of the electrochemical energy storage station may be implemented by software, hardware, or a combination thereof. The above-mentioned modules may be embedded in or independent from a processor in a computer device in a hardware form, and may also be stored in a memory in the computer device in a software form, so that the processor invokes and executes operations corresponding to the described modules.

Figure 9:
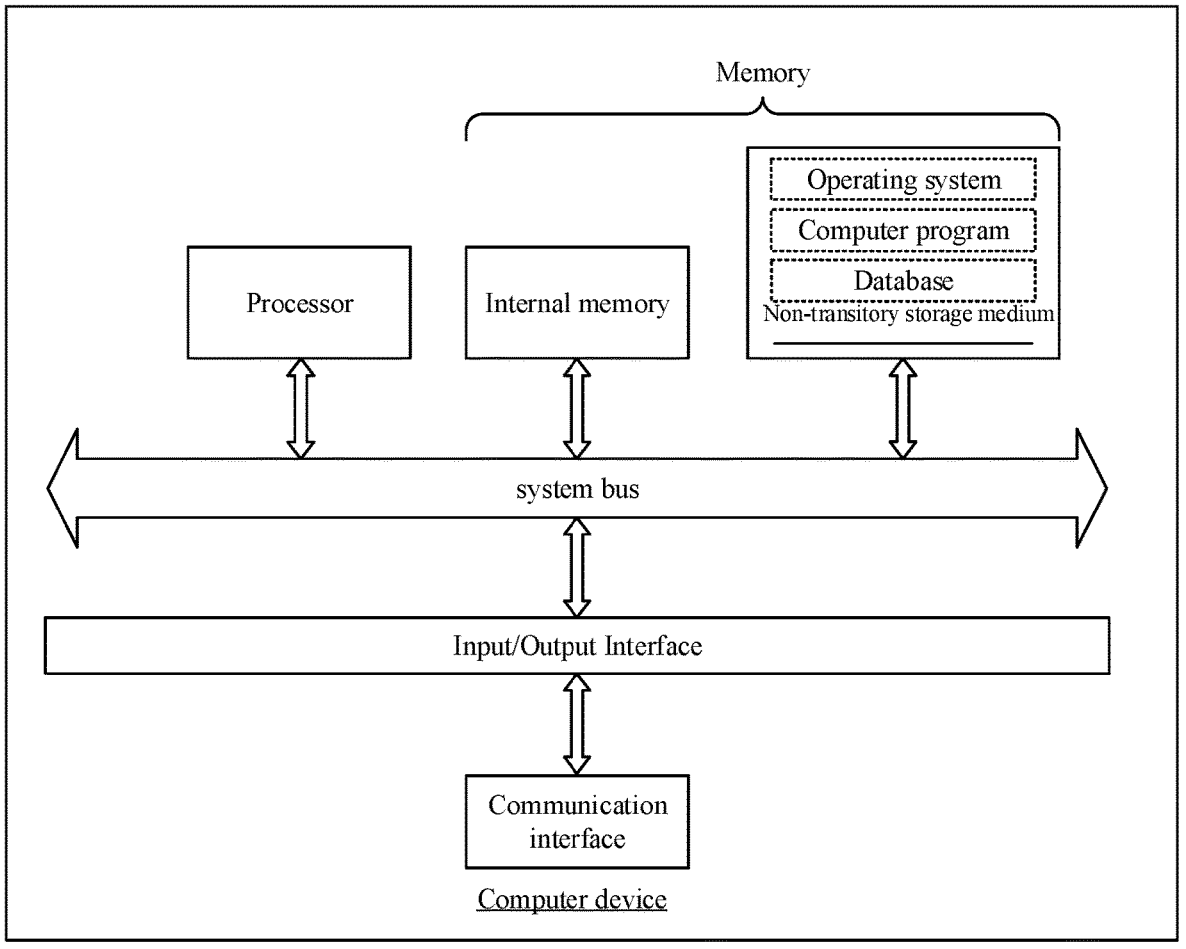
FIG. 9 is an internal structural diagram of a computer device according to an embodiment.

In an embodiment, a computer device is provided. The computer device may be a server, and an internal structure diagram thereof may be as shown in FIG. 9. The computer device includes a processor, a memory, an input/output interface (Input/Output, I/O for short) and a communication interface. The processor, the memory, and the input/output interface are connected by using a system bus, and the communications interface is connected to the system bus by using the input/output interface. The processor of the computer device is configured to provide computation and control capabilities, and the memory of the computer device includes a non-transitory storage medium and an internal memory. The non-transitory storage medium stores an operating system, a computer program, and a database. The internal memory provides an environment for running of the operating system and the computer program in the non-transitory storage medium. A database of the computer device is configured to store cloud edge data transmission data of an electrochemical energy storage station, and an input/output interface of the computer device is used for exchanging information between a processor and an external device. A communication interface of the computer device is configured to communicate with an external terminal through a network connection. When being executed by a processor, the computer program implements a method for transmitting an electrochemical energy storage station cloud edge data.

A person skilled in the art may understand that the structure shown in FIG. 9 is only a partial block structure related to the solution of the present disclosure, and does not limit the computer device to which the solution of the present disclosure is applied. A specific computer device may include more or fewer components than those shown in the figure, or combine some components, or have different component arrangements.

In an embodiment, a computer device is provided, including a memory and a processor. The memory stores a computer program, and the processor, when executing the computer program, implements steps of the method according to the above method embodiments.

In an embodiment, a computer readable storage medium is provided, on which a computer program is stored. When the computer program is executed by a processor, steps of the method according to the above method embodiments.

In an embodiment, a computer program product is provided. The computer program product includes a computer program that, when executed by a processor, implements steps of the method according to the above method embodiments.

It should be noted that, the user information (including but not limited to user equipment information, user personal information, and the like) and data (including but not limited to data used for analysis, stored data, displayed data, and the like) involved in the present disclosure are: information and data which are authorized by a user or sufficiently authorized by each party, and collection, use and processing of relevant data need to comply with relevant legal regulations and standards of relevant countries and regions.

Persons of ordinary skill in the art may understand that all or a part of the processes of the methods in the foregoing embodiments may be implemented by a computer program instructing relevant hardware. The computer program may be stored in a non-transitory computer readable storage medium. When the computer program is executed, the processes of the methods in the foregoing embodiments may be included. Any references to memory, databases, or other media used in the various embodiments provided herein may include at least one of non-transitory and transitory memory. The non-transitory memory may include a read-only memory (ROM), a magnetic tape, a floppy disk, a flash memory, an optical memory, a high density embedded non-transitory memory, a resistive random-access memory (ReRAM), a magnetic random-access memory (MRAM), a ferroelectric random access memory (FRAM), a phase change memory (PCM), a graphene memory, or the like. The transitory memory may include a random-access memory (Random Access Memory, RAM), an external cache memory, or the like. By way of illustration and not limitation, RAM may be in a variety of forms, such as static random-access memory (SRAM) or dynamic random access memory (DRAM). The database involved in the embodiments provided by the present disclosure may include at least one of a relational database and a non-relational database. The non-relational database may include, but is not limited to, a distributed database based on a block chain. The processor involved in the embodiments of the present disclosure may be a general processor, a central processing unit, a graphic processor, a digital signal processor, a programmable logic device, a data processing logic device based on quantum computation, and the like, but is not limited thereto.

Various technical features of the foregoing embodiments may be combined in any way, and for brevity of description, all possible combinations of the technical features in the foregoing embodiments are not described. However, as long as combinations of these technical features are not contradictory, all these technical features should be considered to belong to the scope of the description.

The foregoing embodiments merely represent several implementations of the present disclosure, and are described in detail, but are not intended to limit the scope of the present disclosure. It should be noted that, for those skilled in the art, various modifications and improvements can be made without departing from the concept of the present disclosure, and all these modifications and improvements belong to the scope of protection of the present disclosure. Therefore, the scope of protection of the present disclosure shall be subject to the appended claims.

What is claimed is:

1. A method for cloud-edge data transmission of an electrochemical energy storage station, applied to an edge node, comprising:

detecting a communication status between the edge node and a cloud node;

caching first data to be transmitted and sending a connection re-establishment request to the cloud node in case where abnormal communication is detected between the edge node and the cloud node;

sending to the cloud node second data to be transmitted in a case where a re-establishment acknowledgement message returned by the cloud node in response to the connection re-establishment request is received, the second data following the first data and corresponding to a first period;

sending the cached first data to the cloud node in an idle period after the first period;

detecting a working condition;

determining a characteristic value of third data to be transmitted, sending the characteristic value to the cloud node, and caching a non-characteristic value apart from the characteristic value, in a case where an abnormal working condition of the edge node is detected;

sending to the cloud node fourth data to be transmitted in a case where a restored working condition of the edge node is detected, the fourth data following the third data and corresponding to a second period;

sending the non-characteristic value of the third data to the cloud node in an idle period after the second period;

determining a point list difference between an edge node point list and a preset electrochemical energy storage station point list in response to a check request for point lists; and synchronously updating the edge node point list according to the electrochemical energy storage station point list in a case where the point list difference satisfies a first preset condition.

2. The method according to claim 1, wherein the first data comprises at least one data packet; and the sending the cached first data to the cloud node in an idle period after the first period comprises:

determining, in the idle period, a target data packet from the at least one data packet; and sending the target data packet to the cloud node.

3. The method according to claim 1, wherein the second data carries a real-time data identifier, and the first data carries a historical data identifier; the cloud node is provided with a real-time database and a historical database; and the real-time database is configured to store the second data, and the historical database is configured to store the first data.

4. The method according to claim 3, wherein the cloud node identifies the first or second data, stores the second data in the real-time database when it is identified that the second data carries the real-time data identifier, and stores the first data in the historical database when it is identified that the first data carries the historical data identifier.

5. The method according to claim 1, further comprising:

receiving a configuration parameter of the electrochemical energy storage station sent by the cloud node;

performing parameter configuration on the electrochemical energy storage station according to the configuration parameter of the electrochemical energy storage station, so as to obtain a parameter configuration result of the electrochemical energy storage station; and returning the parameter configuration result to the cloud node.

6. The method according to claim 5, further comprising: after the returning the parameter configuration result to the cloud node, acquiring the configuration parameter of the electrochemical energy storage station from the cloud node;

determining a parameter configuration difference between the edge node and the cloud node according to the configuration parameter of the electrochemical energy storage station; and returning to the step of receiving the configuration parameter of the electrochemical energy storage station sent by the cloud node in a case where the parameter configuration difference satisfies a second preset condition.

7. An apparatus for cloud-edge data transmission of an electrochemical energy storage station, wherein the apparatus comprises a memory and a processor, wherein the memory stores a computer program, and wherein the apparatus further comprises:

a cache module, implemented by the processor executing the stored computer program, configured to detect a communication status between an edge node and a cloud node, cache first data to be transmitted and send a connection re-establishment request to the cloud node in a case where abnormal communication is detected between the edge node and the cloud node;

a real-time module, implemented by the processor executing the stored computer program, configured to send to the cloud node second data to be transmitted in a case where a re-establishment acknowledgement message returned by the cloud node in response to the connection re-establishment request is received, wherein the second data follows the first data and corresponds to a first period;

a resuming transmission module, implemented by the processor executing the stored computer program, configured to send the cached first data to the cloud node in an idle period after the first period;

a working condition abnormality module, implemented by the processor executing the stored computer program, configured to detect a working condition, determine a characteristic value of third data to be transmitted, send the characteristic value to the cloud node, and cache a non-characteristic value apart from the characteristic value in the case where an abnormal working condition of the edge node is detected;

a working condition restorage module, implemented by the processor executing the stored computer program, configured to send to the cloud node fourth data to be transmitted in a case where a restored working condition of the edge node is detected, wherein the fourth data follows the third data and corresponds to a second period;

a characteristic sending module, implemented by the processor executing the stored computer program, configured to send the non-characteristic value of the third data to the cloud node in an idle period after the second period;

a checking request module, implemented by the processor executing the stored computer program, configured to determine a point list difference between an edge node point list and a preset electrochemical energy storage station point list in response to a check request for point lists; and a point list updating module, implemented by the processor executing the stored computer program, configured to synchronously update the edge node point list according to the electrochemical energy storage station point list in a case where the point list difference satisfies a first preset condition.

8. A computer device, comprising a memory and a processor, wherein the memory stores a computer program, and the processor, when executing the computer program, implements steps of the method according to claim 1.

9. A computer readable storage medium, on which a computer program is stored, wherein when the computer program is executed by a processor, steps of the method according to claim 1 are implemented.

\* \* \* \* \*